No. 861,865. PATENTED JULY 30, 1907.
G. & G. C. G. LAUBE.
BREAD BOARD.
APPLICATION FILED APR. 18, 1906.

Witnesses:
Inventors:
Godfried Laube
Grover C. G. Laube,
by
Attorneys

UNITED STATES PATENT OFFICE.

GODFRIED LAUBE AND GROVER C. G. LAUBE, OF SANTA MONICA, CALIFORNIA, ASSIGNORS OF ONE-FOURTH TO JOHN C. MILLER AND ONE-FOURTH TO LOUIS H. NEWMAN, OF LOS ANGELES, CALIFORNIA.

BREAD-BOARD.

No. 861,865.     Specification of Letters Patent.     Patented July 30, 1907.

Application filed April 18, 1906. Serial No. 312,411.

*To all whom it may concern:*

Be it known that we, GODFRIED LAUBE and GROVER C. G. LAUBE, citizens of the United States of America, residing at Santa Monica, in the county of Los Angeles and State of California, have invented certain new and useful Improvements in Bread-Boards, of which the following is a specification, reference being had therein to the accompanying drawing.

This invention relates to bread boards, and its object is to provide a device of this character which will serve as a simple and convenient support for a bread knife.

The construction of the improvement will be fully described hereinafter in connection with the accompanying drawing which forms a part of this specification and its novel features will be defined in the appended claims.

Figure 1:
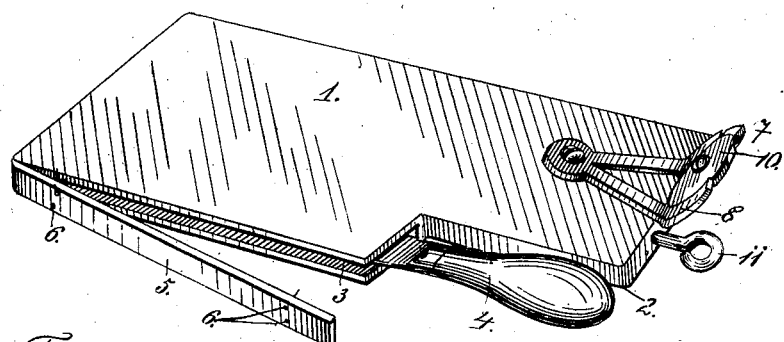
Figure 1:
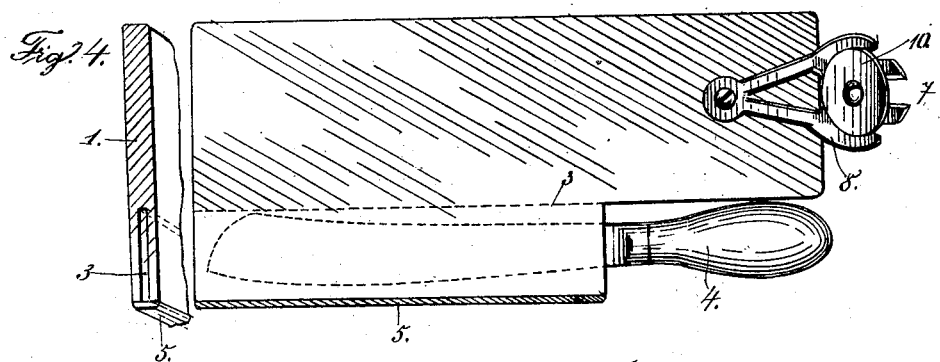
Figure 1:
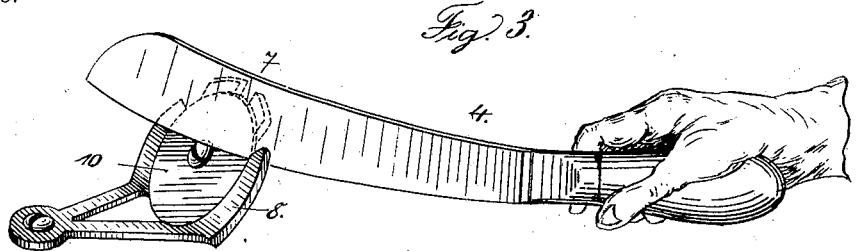

In the drawing: Figure 1 is a perspective view of our improved bread board, Fig. 2 is a plan of the same, Fig. 3 is a perspective view of the knife sharpener attachment, illustrating the manner in which a knife is sharpened. Fig. 4 is a sectional perspective view of the bread board.

To put our invention into practice, we construct our improved bread board of a substantially rectangular piece of wood 1, as pine, the surface of which is coated with paraffin, or a similar ingredient, to provide a germ proof and sanitary board having a smooth and clean surface. The board at its one corner is cut away, as at 2, and provided, in its edge, with a longitudinally disposed slot 3, to form a casing or receptacle for a conventional form of bread knife 4, said knife having either a plain or corrugated cutting edge, as may be desired. The board 1 upon its edge adjacent to the slot 3 is provided with a strip 5, said strip serving to close the one side of the slot 3 and form a housing for the knife 4. Said strip may be glued to the edges of the board 1 or may be secured thereto by nails or tacks, as at 6.

As shown in Figs. 1 and 2, the handle of the knife, when in position, is located within the space provided by the cut-away portion of the board, the blade of the knife extending into the slot, the knife being supported by the inner end of the handle portion. By this arrangement, the handle of the knife is protected by the walls of the board from being given a lateral or rocking movement of sufficient magnitude to cause the cutting edge of the knife to be forcibly driven into contact with the board or strip, while the fact that the slot is of sufficient size as to permit the blade to be readily inserted, without the necessity of positioning the blade within the slot, eliminates liability of the cutting edge being dulled as the knife is placed in position.

The opposite edge of the board 1 is provided with a conventional form of knife sharpener 7, said sharpener consisting of an angular bracket 8 to which is secured a disk 10, the support for the disk being bent upwardly at an angle, as shown, so that the sharpening edges provided by the disk and the adjacent portion of the support, will extend in such direction as to permit the knife, during the sharpening operation, to be drawn in a direction approximately parallel with the plane of the board, so that the knife may be sharpened by the sharpening device while the board is in position for use, the sharpening device, however, being in a position where it is not liable to affect the use of the board.

The operation of sharpening the knife is clearly illustrated in Fig. 3 of the drawings, where it will be observed that the knife blade is being drawn between the disk 10 and the bracket 8.

We have provided one end of the board 1 with a screw eye 11 whereby the board may be suspended from a suitable support in any convenient place.

By combining the above mentioned articles in the manner just described, a neat, handy and extremely useful household article is provided which can be maintained in perfect condition at all times.

In housing the knife within the board, the knife is always located at a convenient place relative to the board 1 and is prevented from injuring a person or becoming injured itself, should the board accidentally fall or become displaced from its support.

What we claim and desire to secure by Letters Patent, is:—

A bread board cut away at one corner thereof and having a slot extending along its edge adjacent to the cut away corner from the inner end of said cut away corner to a point near the opposite end of the board, and a strip secured to the slotted edge of the board and closing the slot along the upper edge thereof, the space provided by said cut-away portion being of sufficient size to receive the handle of a knife the blade of which extends into said slot, the knife being supported by the inner end of the handle, the walls of said space and of said slot preventing accidental lateral or rocking movement in a direction to forcibly carry the cutting edge of the knife into contact with the walls of the slot.

In testimony whereof we affix our signatures in the presence of two witnesses.

GODFRIED LAUBE.
                               GROVER C. G. LAUBE.

Witnesses:
    HATTIE R. LAUBE,
    ZULA V. LAUBE.